US010652944B2

United States Patent
Iinuma

(10) Patent No.: US 10,652,944 B2
(45) Date of Patent: May 12, 2020

(54) APPARATUS AND METHOD TO CONTROL RECONNECTION OF A TERMINAL DEVICE TO A WIRELESS NETWORK VIA ANOTHER WIRELESS NETWORK

(71) Applicant: Fujitsu Client Computing Limited, Kanagawa (JP)

(72) Inventor: Nobuharu Iinuma, Yokohama (JP)

(73) Assignee: FUJITSU CLIENT COMPUTING LIMITED, Kanagawa (JP)

( * ) Notice: Subject to any disclaimer, the term of this patent is extended or adjusted under 35 U.S.C. 154(b) by 134 days.

(21) Appl. No.: 15/704,117

(22) Filed: Sep. 14, 2017

(65) Prior Publication Data
US 2018/0098375 A1     Apr. 5, 2018

(30) Foreign Application Priority Data

Sep. 30, 2016   (JP) ................................. 2016-194718

(51) Int. Cl.
| H04W 76/19 | (2018.01) |
| H04L 29/12 | (2006.01) |
| H04W 48/10 | (2009.01) |

(52) U.S. Cl.
CPC ......... *H04W 76/19* (2018.02); *H04L 61/2038* (2013.01); *H04W 48/10* (2013.01); *H04L 61/6022* (2013.01)

(58) Field of Classification Search
CPC .. H04W 76/19; H04W 48/10; H04L 61/2038; H04L 61/6022
See application file for complete search history.

(56) References Cited

U.S. PATENT DOCUMENTS

| 2005/0003765 A1* | 1/2005 | Alfano .................. H04W 48/18 455/67.11 |
| 2006/0039337 A1 | 2/2006 | Hodoshima |
| 2007/0047480 A1* | 3/2007 | Suga ..................... H04W 48/14 370/328 |
| 2011/0307546 A1* | 12/2011 | Iovene ................... H04L 45/00 709/203 |
| 2012/0329456 A1* | 12/2012 | Makh .................... H04W 48/14 455/435.1 |
| 2014/0219148 A1 | 8/2014 | Zhao et al. |
| 2016/0278158 A1* | 9/2016 | Van Oost .............. H04W 12/04 |

FOREIGN PATENT DOCUMENTS

| JP | 8-195749 A | 7/1996 |
| JP | 2005-175814 A | 6/2005 |
| JP | 2006-60336 A | 3/2006 |
| JP | 2006-513644 A | 4/2006 |
| JP | 2015-510364 A | 4/2015 |

* cited by examiner

*Primary Examiner* — Rina C Pancholi
(74) *Attorney, Agent, or Firm* — Osha Liang LLP

(57) ABSTRACT

An apparatus obtains connection status information of each of terminal devices coupled to a first wireless network via an access point, from the access point. The apparatus detects a disconnected device which is a terminal device whose communication with the access point is disconnected, with reference to the connection status information, and notifies, by using a second wireless network, the disconnected device of a reconnection instruction for instructing the disconnected device to reconnect to the first wireless network by accessing the access point.

9 Claims, 14 Drawing Sheets

FIG. 3

| TABLET TERMINAL | MAC ADDRESS | TRANSMISSION CHANNEL | | |
|---|---|---|---|---|
| | | FIRST TIME | SECOND TIME | THIRD TIME |
| STUDENT A | A1:B2:C3:F3:E2:D1 | 37 ch | 37 ch | 37 ch |
| STUDENT B | A1:B2:C3:F3:E2:D2 | 37 ch | 37 ch | 38 ch |
| STUDENT C | A1:B2:C3:F3:E2:D3 | 37 ch | 37 ch | 39 ch |
| STUDENT D | A1:B2:C3:F3:E2:D4 | 37 ch | 38 ch | 37 ch |
| STUDENT E | A1:B2:C3:F3:E2:D5 | 37 ch | 38 ch | 38 ch |
| STUDENT F | A1:B2:C3:F3:E2:D6 | 37 ch | 38 ch | 39 ch |
| STUDENT G | A1:B2:C3:F3:E2:D7 | 37 ch | 39 ch | 37 ch |
| STUDENT H | A1:B2:C3:F3:E2:D8 | 37 ch | 39 ch | 38 ch |
| STUDENT I | A1:B2:C3:F3:E2:D9 | 37 ch | 39 ch | 39 ch |
| STUDENT J | A1:B2:C3:F3:E2:DA | 38 ch | 37 ch | 37 ch |
| STUDENT K | A1:B2:C3:F3:E2:DB | 38 ch | 37 ch | 38 ch |
| STUDENT L | A1:B2:C3:F3:E2:DC | 38 ch | 37 ch | 39 ch |
| STUDENT M | A1:B2:C3:F3:E2:DD | 38 ch | 38 ch | 37 ch |
| STUDENT O | A1:B2:C3:F3:E2:DE | 38 ch | 38 ch | 38 ch |
| STUDENT P | A1:B2:C3:F3:E2:DF | 38 ch | 38 ch | 39 ch |
| STUDENT Q | A1:B2:C3:F3:E2:E0 | 38 ch | 39 ch | 37 ch |
| STUDENT R | A1:B2:C3:F3:E2:E1 | 38 ch | 39 ch | 38 ch |
| STUDENT S | A1:B2:C3:F3:E2:E2 | 38 ch | 39 ch | 39 ch |
| STUDENT T | A1:B2:C3:F3:E2:E3 | 39 ch | 37 ch | 37 ch |
| STUDENT U | A1:B2:C3:F3:E2:E4 | 39 ch | 37 ch | 38 ch |
| STUDENT V | A1:B2:C3:F3:E2:E5 | 39 ch | 37 ch | 39 ch |
| STUDENT W | A1:B2:C3:F3:E2:E6 | 39 ch | 38 ch | 37 ch |
| STUDENT X | A1:B2:C3:F3:E2:E7 | 39 ch | 38 ch | 38 ch |
| STUDENT Y | A1:B2:C3:F3:E2:E8 | 39 ch | 38 ch | 39 ch |
| STUDENT Z | A1:B2:C3:F3:E2:E9 | 39 ch | 39 ch | 37 ch |
| STUDENT α | A1:B2:C3:F3:E2:EA | 39 ch | 39 ch | 38 ch |
| STUDENT β | A1:B2:C3:F3:E2:EB | 39 ch | 39 ch | 39 ch |

FIG. 4

| TABLET TERMINAL | MAC ADDRESS | STATUS | DISCONNECTION TIME | DISCONNECTION REASON |
|---|---|---|---|---|
| STUDENT A | A1:B2:C3:F3:E2:D1 | CONNECTING | — | — |
| STUDENT B | A1:B2:C3:F3:E2:D2 | CONNECTING | — | — |
| STUDENT C | A1:B2:C3:F3:E2:D3 | UNCONNECTED | 9:45 | UNEXPECTED DISCONNECTION |
| STUDENT D | A1:B2:C3:F3:E2:D4 | CONNECTING | — | — |
| STUDENT E | A1:B2:C3:F3:E2:D5 | CONNECTING | — | — |
| STUDENT F | A1:B2:C3:F3:E2:D6 | CONNECTING | — | — |
| STUDENT G | A1:B2:C3:F3:E2:D7 | CONNECTING | — | — |
| STUDENT H | A1:B2:C3:F3:E2:D8 | CONNECTING | — | — |
| STUDENT I | A1:B2:C3:F3:E2:D9 | CONNECTING | — | — |
| STUDENT J | A1:B2:C3:F3:E2:DA | CONNECTING | — | — |
| STUDENT K | A1:B2:C3:F3:E2:DB | CONNECTING | — | — |
| STUDENT L | A1:B2:C3:F3:E2:DC | CONNECTING | — | — |
| STUDENT M | A1:B2:C3:F3:E2:DD | CONNECTING | — | — |
| STUDENT O | A1:B2:C3:F3:E2:DE | CONNECTING | — | — |
| STUDENT P | A1:B2:C3:F3:E2:DF | CONNECTING | — | — |
| STUDENT Q | A1:B2:C3:F3:E2:E0 | CONNECTING | — | — |
| STUDENT R | A1:B2:C3:F3:E2:E1 | CONNECTING | — | — |
| STUDENT S | A1:B2:C3:F3:E2:E2 | CONNECTING | — | — |
| STUDENT T | A1:B2:C3:F3:E2:E3 | CONNECTING | — | — |
| STUDENT U | A1:B2:C3:F3:E2:E4 | CONNECTING | — | — |
| STUDENT V | A1:B2:C3:F3:E2:E5 | CONNECTING | — | — |
| STUDENT W | A1:B2:C3:F3:E2:E6 | CONNECTING | — | — |
| STUDENT X | A1:B2:C3:F3:E2:E7 | CONNECTING | — | — |
| STUDENT Y | A1:B2:C3:F3:E2:E8 | CONNECTING | — | — |
| STUDENT Z | A1:B2:C3:F3:E2:E9 | CONNECTING | — | — |
| STUDENT α | A1:B2:C3:F3:E2:EA | CONNECTING | — | — |
| STUDENT β | A1:B2:C3:F3:E2:EB | CONNECTING | — | — |

FIG. 10

| TABLET TERMINAL | MAC ADDRESS | BD ADDRESS |
| --- | --- | --- |
| STUDENT A | A1:B2:C3:F3:E2:D1 | B1:C2:D3:G3:F2:E1 |
| STUDENT B | A1:B2:C3:F3:E2:D2 | B1:C2:D3:G3:F2:E2 |
| STUDENT C | A1:B2:C3:F3:E2:D3 | B1:C2:D3:G3:F2:E3 |
| STUDENT D | A1:B2:C3:F3:E2:D4 | B1:C2:D3:G3:F2:E4 |
| STUDENT E | A1:B2:C3:F3:E2:D5 | B1:C2:D3:G3:F2:E5 |
| STUDENT F | A1:B2:C3:F3:E2:D6 | B1:C2:D3:G3:F2:E6 |
| STUDENT G | A1:B2:C3:F3:E2:D7 | B1:C2:D3:G3:F2:E7 |
| STUDENT H | A1:B2:C3:F3:E2:D8 | B1:C2:D3:G3:F2:E8 |
| STUDENT I | A1:B2:C3:F3:E2:D9 | B1:C2:D3:G3:F2:E9 |
| STUDENT J | A1:B2:C3:F3:E2:DA | B1:C2:D3:G3:F2:EA |
| STUDENT K | A1:B2:C3:F3:E2:DB | B1:C2:D3:G3:F2:EB |
| STUDENT L | A1:B2:C3:F3:E2:DC | B1:C2:D3:G3:F2:EC |
| STUDENT M | A1:B2:C3:F3:E2:DD | B1:C2:D3:G3:F2:ED |
| STUDENT O | A1:B2:C3:F3:E2:DE | B1:C2:D3:G3:F2:EE |
| STUDENT P | A1:B2:C3:F3:E2:DF | B1:C2:D3:G3:F2:EF |
| STUDENT Q | A1:B2:C3:F3:E2:E0 | B1:C2:D3:G3:F2:F0 |
| STUDENT R | A1:B2:C3:F3:E2:E1 | B1:C2:D3:G3:F2:F1 |
| STUDENT S | A1:B2:C3:F3:E2:E2 | B1:C2:D3:G3:F2:F2 |
| STUDENT T | A1:B2:C3:F3:E2:E3 | B1:C2:D3:G3:F2:F3 |
| STUDENT U | A1:B2:C3:F3:E2:E4 | B1:C2:D3:G3:F2:F4 |
| STUDENT V | A1:B2:C3:F3:E2:E5 | B1:C2:D3:G3:F2:F5 |
| STUDENT W | A1:B2:C3:F3:E2:E6 | B1:C2:D3:G3:F2:F6 |
| STUDENT X | A1:B2:C3:F3:E2:E7 | B1:C2:D3:G3:F2:F7 |
| STUDENT Y | A1:B2:C3:F3:E2:E8 | B1:C2:D3:G3:F2:F8 |
| STUDENT Z | A1:B2:C3:F3:E2:E9 | B1:C2:D3:G3:F2:F9 |
| STUDENT α | A1:B2:C3:F3:E2:EA | B1:C2:D3:G3:F2:FA |
| STUDENT β | A1:B2:C3:F3:E2:EB | B1:C2:D3:G3:F2:FB |

APPARATUS AND METHOD TO CONTROL RECONNECTION OF A TERMINAL DEVICE TO A WIRELESS NETWORK VIA ANOTHER WIRELESS NETWORK

CROSS-REFERENCE TO RELATED APPLICATIONS

This application is based upon and claims the benefit of priority of the prior Japanese Patent Application No. 2016-194718, filed on Sep. 30, 2016, the entire contents of which are incorporated herein by reference.

FIELD

The embodiments discussed herein are related to apparatus and method to control reconnection of a terminal device to a wireless network via another wireless network.

BACKGROUND

According to a promotion of information and communication technology (ICT) education by government policy, for elementary and junior high schools all over the country, one tablet computer (hereinafter, may be referred to as "tablet") per 3.6 students is deployed by the year 2017 and one per one student is deployed by the year 2020, and an achievement rate of 100% in maintenance of a wireless local area network (LAN) is planned.

In this way, although ICT education has been gradually processed at each of schools, even now, there are schools which provide classes with a digital textbook by deploying an electronic blackboard, a wireless LAN access point (hereinafter, may be referred to as "AP"), a tablet for teacher, and a tablet for student in each of classrooms. In recent years, a technology in which when a terminal device such as a tablet or the like is coupled to another terminal device via a wireless LAN and disconnection from the wireless LAN is detected, a user performs a connection procedure with a wired LAN is known.

Japanese Laid-open Patent Publication No. 2005-175814 is an example of the related art.

SUMMARY

According to an aspect of the invention, an apparatus obtains connection status information of each of terminal devices coupled to a first wireless network via an access point, from the access point. The apparatus detects a disconnected device which is a terminal device whose communication with the access point is disconnected, with reference to the connection status information, and notifies, via a second wireless network, the disconnected device of a reconnection instruction for instructing the disconnected device to reconnect to the first wireless network by accessing the access point.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of information stored in a beacon pattern database (DB), according to an embodiment;

FIG. 4 is a diagram illustrating an example of information stored in a connection status DB, according to an embodiment;

FIG. 10 is a diagram illustrating an example of information stored in an address information DB, according to an embodiment;

DESCRIPTION OF EMBODIMENTS

Since elementary school students generally do not have high information Technology (IT) literacy, it is difficult to reconnect terminal devices disconnected from a wireless network to a wired network or a wireless network. For this reason, since a teacher manually restores the terminal, the teacher stops the class and restores the terminal device and a progress of the class is hindered every time disconnection of the terminal device occurs. In addition, in a case where the teacher's IT literacy is low, a stop time of the class will be even longer.

It is also conceivable that a tablet terminal has a function of constantly monitoring communication with AP, and a function of executing restarting of an operating system (OS) of the tablet and executing AP reconnection when detecting disconnection. However, since tablet terminals are equipped with processors with lower performance than general personal computers, a screen display or the like is delayed when these functions are included.

It is preferable to automatically reconnect a terminal device disconnected from a wireless network, with the wireless network.

Hereinafter, examples of a monitoring device, a reconnection method, and a reconnection program disclosed in the present application will be described in detail with reference to drawings. The embodiment is not limited by this example.

In addition, each of the examples can be appropriately combined within a range without contradiction.

Example 1

Overall Configuration Example

Figure 1:
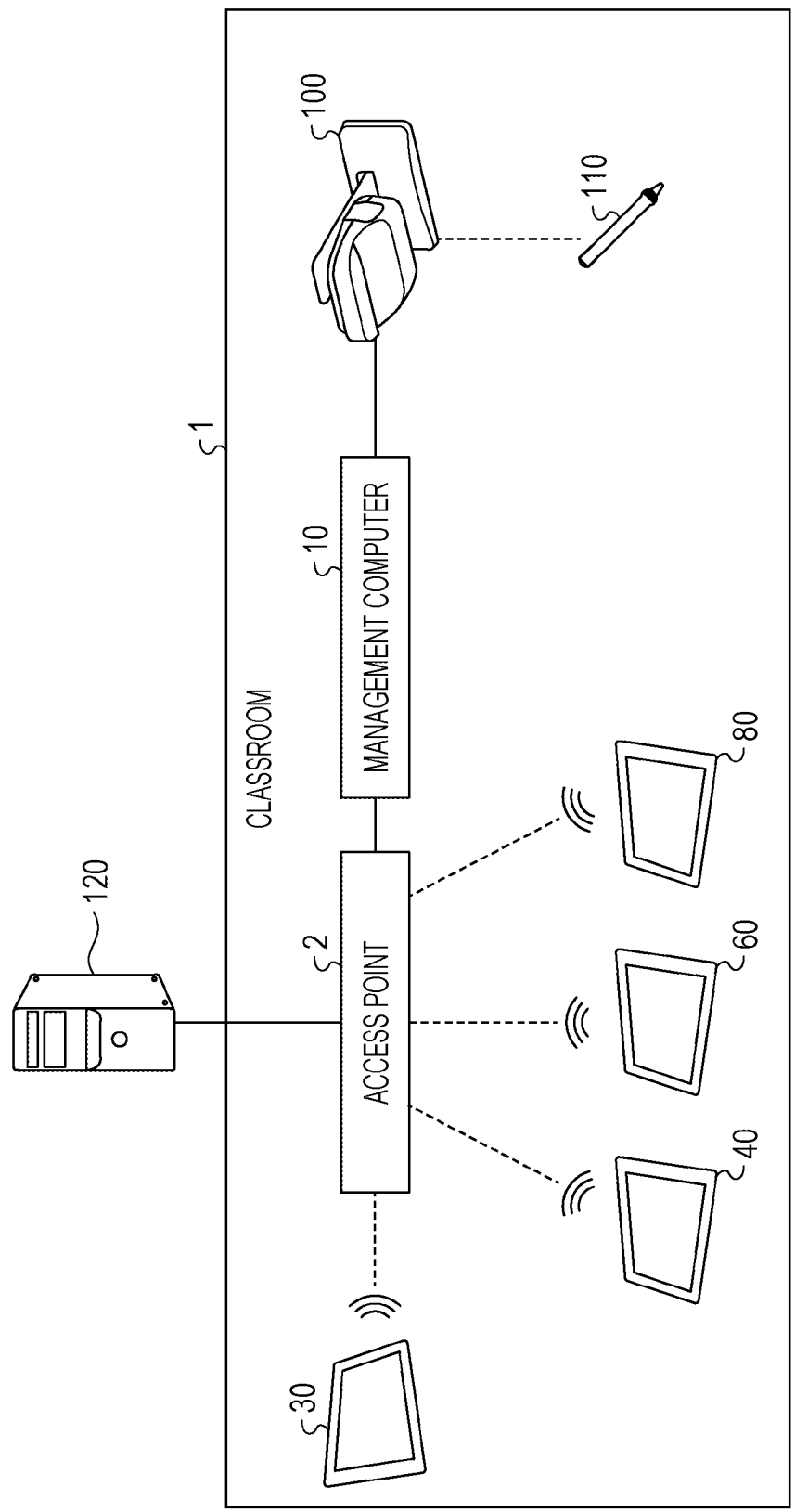
FIG. 1 is a diagram illustrating an example of an overall configuration of a system, according to an embodiment.

FIG. 1 is a diagram illustrating an overall configuration example of a system according to Example 1. In Example 1, as an example, a school class or the like is assumed. For example, a wireless LAN is built in a classroom, tablet terminals are distributed to each student and teacher, and a class is held by displaying information such as a textbook on the tablet terminals by using the wireless LAN.

FIG. 1 illustrates a classroom 1 and a server 120 installed outside the classroom 1. In the classroom 1, a wireless LAN such as a Wireless-Fidelity (Wi-Fi)® is built and the classroom 1 includes an access point 2, a management computer 10, a tablet terminal 30 for teacher, tablet terminals 40, 60, and 80 for students, an electronic blackboard projector 100, and an electronic pen 110.

The access point 2 is an example of a device which connects each of tablet terminals in the classroom 1 to a wireless LAN and connects the external server 120 to the wireless LAN in the classroom 1, and is generally a computer such as a router, a station, for example.

The tablet terminal 30 for teacher and the tablet terminals 40, 60, and 80 for students are examples of portable mobile terminals and are computers having a touch panel, a wireless connection function, and the like. These tablet terminals are equipped with processors having lower performance than an ordinary personal computer for the purpose of reducing the thickness and weight, and the battery operation.

In addition, these tablet terminals are coupled to a wireless LAN via the access point 2 and are coupled to each other so as to communicate with each other. Further, each of the tablet terminals is coupled to the external server 120 via the access point 2. Each of the tablet terminals displays textbook data delivered from the management computer 10 or the server 120. Here, a class is held using textbook data instead of an ordinary textbook.

The management computer 10 is an example of a computer such as a monitoring device and is coupled to the access point 2 via a wireless LAN or a wired line. The management computer 10 obtains textbook data from the server 120 via the access point 2 and delivers the data to each of the tablet terminals coupled to a wireless LAN via the access point 2.

For example, the electronic blackboard projector 100 is coupled to the management computer 10 via a wired line such as a High-Definition Multimedia Interface (HDMI)®. The electronic blackboard projector 100 projects various images and videos input from the management computer 10 on a screen. In addition, the electronic blackboard projector 100 is coupled to the electronic pen 110 via infrared rays or the like and projects operation information by the electronic pen 110 on the screen together with various images and videos input from the management computer 10.

The server 120 is an example of an external server which is coupled to the access point 2 and holds textbook data. Upon receiving a request for data acquisition from each of the tablet terminals or the management computer 10, the server 120 transmits the textbook data to a request destination via the access point 2.

In this way, in a state in which the tablet terminal 30 for teacher and the tablet terminals 40, 60, and 80 for students are coupled to a wireless LAN via the access point 2, the management computer 10 obtains, from the access point 2, connection status of each of the tablet terminals coupled to a wireless LAN via the access point 2. With reference to the connection status, the management computer 10 detects a tablet terminal (hereinafter, sometimes described as "disconnected tablet") disconnected from communication with the access point 2. Thereafter, the management computer 10 notifies, by using a Bluetooth® Low Energy (BLE) beacon, the disconnected tablet being disconnected from a wireless LAN of a reconnection instruction for instructing the disconnected tablet to reconnect with a wireless LAN by accessing the access point 2.

Therefore, upon detecting a tablet for student disconnected from a wireless LAN in a classroom during a class, the management computer 10 transmits the reconnection instruction for reconnection with a wireless LAN, by using a BLE beacon. As a result, the tablet terminal disconnected from a wireless LAN may automatically reconnect with a wireless LAN without a teacher or a student performing recovery operation.

Functional Configuration

Next, functional configurations of devices illustrated in FIG. 1 will be described. Here, functional configurations of the management computer 10 and each of the tablet terminals, which have functions different from a general device, will be described. Since each of the tablet terminals has the same configuration, the tablet terminal 40 will be described as an example.

Functional Configuration of Management Computer 10

Figure 2:
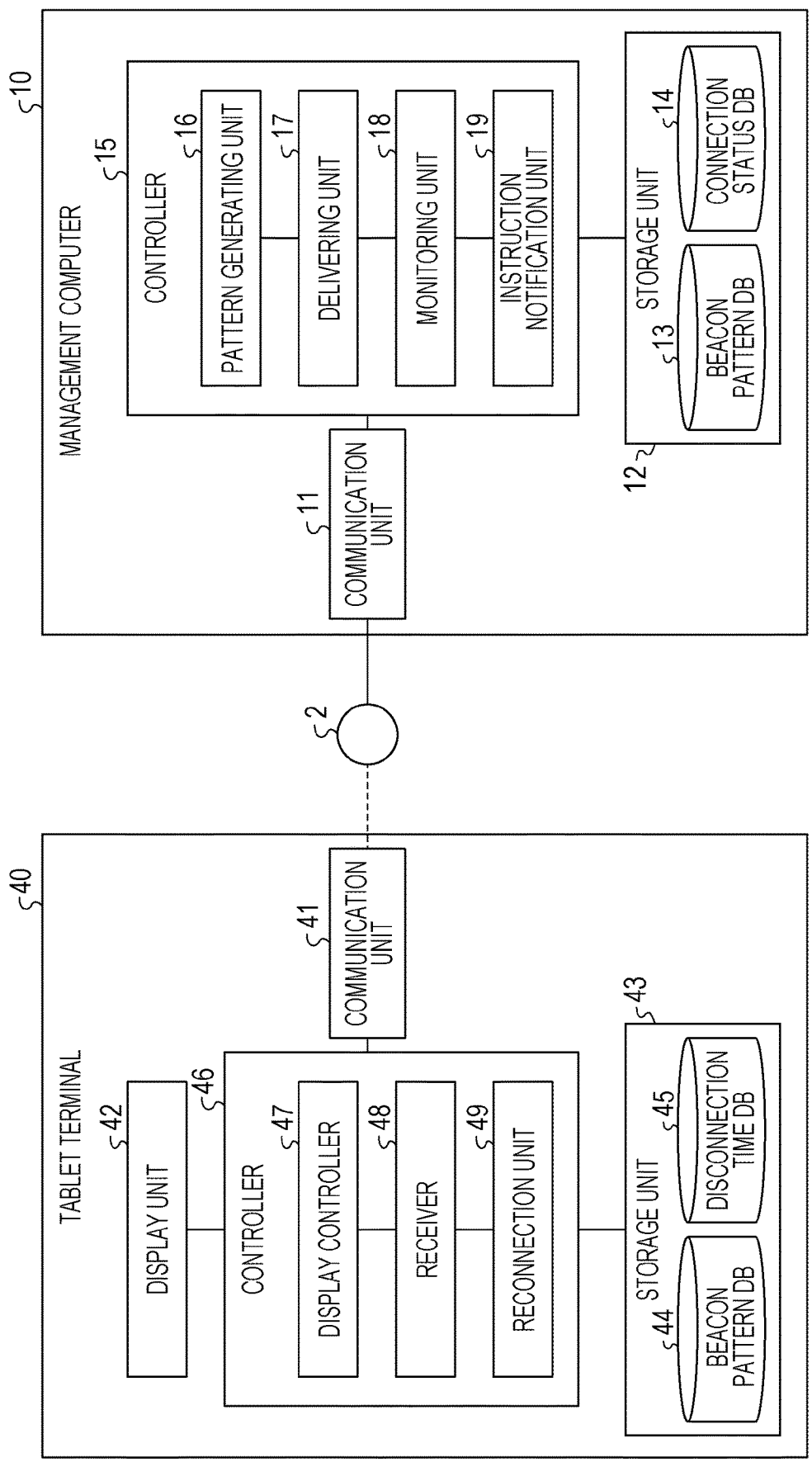
FIG. 2 is a diagram illustrating an example of a functional configuration of each of devices, according to an embodiment.

FIG. 2 is a functional block diagram illustrating a functional configuration of each of devices according to Example 1. As illustrated in FIG. 2, the management computer 10 includes a communication unit 11, a storage unit 12, and a controller 15.

The communication unit 11 is a processing unit which controls various communications such as a wireless communication or a wire communication. For example, the communication unit 11 is coupled to a wireless LAN via the access point 2, transmits information to each of the tablet terminals in a wireless LAN, and receives various kinds of information from each of the tablet terminals. For example, the communication unit 11 receives connection status from the access point 2 and transmits textbook data to each of the tablet terminals. In addition, the communication unit 11 executes transmission control of a BLE beacon or the like.

The storage unit 12 is a storage device which stores a program executed by the controller 15 or various kinds of data and is, for example, a memory or a hard disk. The storage unit 12 stores a beacon pattern DB 13 or a connection status DB 14.

The beacon pattern DB 13 is a database storing a beacon pattern which is a combination of channels of transmission frequencies of a BLE beacon. For example, the beacon pattern DB 13 is a combination of advertising channels used in the BLE beacon and stores identification information used for identifying a tablet terminal of each student.

FIG. 3 is a diagram illustrating an example of information stored in the beacon pattern DB 13. As illustrated in FIG. 3, the beacon pattern DB 13 stores "tablet terminal", "media access control (MAC) address", and "transmission channel (first time, second time, and third time)" in association with each other. "tablet terminal" is a name of a tablet terminal used by a student, and "MAC address" is a MAC address of the tablet terminal for each student. "transmission channel" is channel information of an advertising channel, and "first time", "second time", and "third time" are advertising channels used by a BLE beacon.

In the example in FIG. 3, in a case of transmitting an instruction to a tablet terminal of a student A of which a MAC address is "A1:B2:C3:F3:E2:D1", "37 ch" is used for the first time, "37 ch" is used for the second time, and "37 ch" is used for the third time. In this way, by a combination of advertising channels (37 ch, 38 ch, and 39 ch), each of the tablet terminals is identified. The combination of advertising channels may be changed for each of classes. In addition, in FIG. 3, a tablet terminal for teacher is excluded from a management target, but the tablet terminal for teacher may be included in the management target in the same manner as a tablet terminal for student.

The connection status DB 14 is a database which stores connection status of each of the tablet terminals coupled to a wireless LAN. Information stored here may be collected by the access point 2.

FIG. 4 is a diagram illustrating an example of information stored in the connection status DB 14. As illustrated in FIG. 4, the connection status DB 14 stores "tablet terminal", "MAC address", "status", "disconnection time", and "disconnection reason" in association with each other. Here, "tablet terminal" is a name of a tablet terminal used by a student, and "MAC address" is a MAC address of the tablet terminal for each student. "tablet terminal" and "MAC address" may be preset.

"status" indicates connection status and stores "connecting" or "unconnected". "disconnection time" is disconnected time. "disconnection reason" indicates whether or not a tablet terminal is disconnected during a class, and is set at "unexpected disconnection" in a case where the tablet terminal is disconnected during the class. "disconnection reason" may be determined by the access point 2 or the management computer 10.

FIG. 4 illustrates that in a tablet terminal of a student C of which a MAC address is "A1:B2:C3:F3:E2:D3", "unexpected disconnection" occurs at "9:45" and the other tablet terminals of the other students are normally connected.

The controller 15 is a processing unit which manages whole of the management computer 10 and is, for example, a processor or the like. The controller 15 includes a pattern generating unit 16, a delivering unit 17, a monitoring unit 18, and an instruction notification unit 19. The pattern generating unit 16, the delivering unit 17, the monitoring unit 18, and the instruction notification unit 19 are an example of an electronic circuit included in a processor or the like or an example of a process executed by the processor.

The pattern generating unit 16 is a processing unit which generates a combination of advertising channels for identifying each of the tablet terminals. For example, the pattern generating unit 16 generates a beacon pattern illustrated in FIG. 3, and saves the beacon pattern in the beacon pattern DB 13 at a class start time. In addition, the pattern generating unit 16 also may delete information stored in the beacon pattern DB 13 at a class end time. The class start time or the class end time may be preset. In addition, as a generating method, it is possible to adopt a BLE random address setting and the like, and to arbitrarily change a combination of channels or the number of times of transmission, depending on the number of tablet terminals.

The delivering unit 17 is a processing unit which delivers the beacon pattern generated by the pattern generating unit 16 to each of the tablet terminals via a wireless LAN. For example, when a beacon pattern is saved in the beacon pattern DB 13, the delivering unit 17 reads the beacon pattern from the beacon pattern DB 13 and transmits the beacon pattern, via the access point 2, to each of the tablet terminals by using "MAC address" stored in advance in the connection status DB 14.

The monitoring unit 18 is a processing unit which monitors connection status of a tablet terminal to a wireless LAN for each student. For example, the monitoring unit 18 obtains connection status (status, disconnection time, and the like) from the access point 2, and monitors whether or not unexpected disconnection occurs. For example, the monitoring unit 18 regularly obtains connection status from the access point 2 and saves the obtained connection status in the connection status DB 14. Then, in a case of detecting status "unconnected" during a class, the monitoring unit 18 sets "unexpected disconnection" to "disconnection reason" for a tablet terminal from which status "unconnected" has been detected.

The instruction notification unit 19 is a processing unit which notifies a tablet terminal to which "unexpected disconnection" is set by the monitoring unit 18, by using BLE different from a wireless LAN, of an instruction for reconnection to a wireless LAN by accessing the access point 2. For example, the instruction notification unit 19 specifies a combination of transmission channels corresponding to a tablet terminal for student in a disconnected state, from the beacon pattern DB 13, and broadcasts an instruction for reconnection by using the specified combination.

For example, upon detecting that "unexpected disconnection" is set to a tablet terminal of the student C with reference to the connection status DB 14, the instruction notification unit 19 obtains disconnection time "9:45" from the connection status DB 14. Next, the instruction notification unit 19 obtains transmission channels (37 ch, 37 ch, and 39 ch) of the tablet terminal of the student C in a disconnected state, from the beacon pattern DB 13. Then, the instruction notification unit 19 broadcasts an advertised packet including time information "9:45" which is disconnection time, as a BLE beacon via 37 ch. After a predetermined time (for example, 30 seconds), the instruction notification unit 19 broadcasts an advertised packet including time information "9:45" as a BLE beacon via 37 ch. Further, after a predetermined time (for example, 30 seconds), the instruction notification unit 19 broadcasts an advertised packet including time information "9:45" as a BLE beacon via 39 ch.

That is, by notifying a BLE beacon three times for one disconnection detection, it is possible to notify disconnection time to the tablet terminal of the student C in a disconnected state. The BLE beacon may include a reconnection instruction, a reconnection command, or the like. The predetermined time may be arbitrarily changed.

In this way, by broadcasting packet data with a combination of three frequency channels, it is possible to identify a tablet terminal for student. In addition, since Bluetooth® device address (BD address), which may be an attack target when acquired by a third party, is not included in the beacon, security is high and risk of becoming the attack target of the third party becomes also small.

In addition, in a case where a disconnected tablet terminal is detected and nothing is registered as a disconnection reason, that is, "unexpected disconnection" is not registered as a disconnection reason, the instruction notification unit 19 determines that a class is ended and deletes a beacon pattern stored in the beacon pattern DB 13.

Functional Configuration of Tablet Terminal 40

As illustrated in FIG. 2, the tablet terminal 40 includes a communication unit 41, a display unit 42, a storage unit 43, and a controller 46.

The communication unit 41 is a processing unit which is coupled to a wireless LAN via the access point 2 and controls communication with another tablet terminal, the management computer 10, the server 120, and the like. For example, the communication unit 41 receives textbook data from the management computer 10 via the access point 2.

In addition, the communication unit 41 receives a BLE beacon broadcasted from the management computer 10. For example, the communication unit 41 receives an advertised packet including time information and the like from the management computer 10 without going through the access point 2.

The display unit 42 is a touch panel display which displays each piece of information and accepts operation of a student or the like. For example, the display unit 42 displays textbook data and accepts page turning operation, answer operation to a problem, or the like.

The storage unit 43 is a storage device which stores a program executed by the controller 46 or various kinds of data and is, for example, a memory or a hard disk. The storage unit 43 stores a beacon pattern DB 44 and a disconnection time DB 45.

The beacon pattern DB 44 is a database which stores a beacon pattern which is a combination of transmission frequency channels of a BLE beacon. For example, the beacon pattern DB 44 stores a beacon pattern delivered from the management computer 10. The stored information is the same as in FIG. 3, and a detailed description thereof will be omitted.

The disconnection time DB 45 is a database which stores a time at which the tablet terminal 40 is disconnected from a wireless LAN. For example, the disconnection time DB 45 stores disconnection time "9:45" and the like. Here, the stored disconnection time is the latest disconnection time and is updated by the controller 46.

The controller 46 is a processing unit which manages the overall tablet terminal 40 and is, for example, a processor or the like. The controller 46 includes a display controller 47, a receiver 48, and a reconnection unit 49. The display controller 47, the receiver 48, and the reconnection unit 49 are an example of an electronic circuit included in a processor or the like or an example of a process executed by the processor.

Upon detecting a tablet disconnected from a wireless LAN, the controller 46 determines whether or not disconnected time is in a time zone designated in advance such as a time zone in which a class is ended. In a case where the disconnected time is not in the time zone designated in advance, the controller 46 makes a determination of unexpected disconnection and saves the disconnection time in the disconnection time DB 45. On the other hand, in a case where the disconnected time is in the time zone designated in advance, the controller 46 makes a determination of a class being ended and deletes information stored in the beacon pattern DB 44.

The display controller 47 is a processing unit which executes an information display or touch panel operation. For example, the display controller 47 displays textbook data received from the management computer 10 on the display unit 42. In addition, the display controller 47 accepts touch panel operation via the display unit 42 and executes a process corresponding to the accepted touch panel operation. For example, the display controller 47 executes page turning when swipe operation is accepted and executes an enlarged display when receiving double click operation.

The receiver 48 is a processing unit which receives a beacon pattern delivered from the management computer 10. For example, the receiver 48 receives a beacon pattern from the management computer 10 via the access point 2 and saves the beacon pattern in the beacon pattern DB 44.

The reconnection unit 49 is a processing unit which executes reconnection to a wireless LAN according to a reconnection instruction from the management computer 10. For example, the reconnection unit 49 receives a BLE beacon with a beacon pattern assigned to the tablet terminal 40 and executes reconnection in a case where disconnection time notified with the received BLE beacon matches with disconnection time stored in the disconnection time DB 45.

For example, a case where the tablet terminal 40 is a tablet terminal of the student C will be described. The reconnection unit 49 specifies that a beacon pattern assigned to the tablet terminal 40 is 37 ch, 37 ch, and 39 ch with reference to the beacon pattern DB 44. Thereafter, the reconnection unit 49 receives an advertised packet of a BLE beacon broadcasted from the management computer 10 via 37 ch, subsequently receives an advertised packet of a BLE beacon broadcasted via 37 ch, and lastly receives an advertised packet of a BLE beacon broadcasted via 39 ch.

Then, since the respective channels used by the management computer 10 are equal to a beacon pattern (37 ch, 37 ch, and 39 ch) of the tablet terminal 40, the reconnection unit 49 determines that the advertised packets are addressed to the tablet terminal 40. The reconnection unit 49 extracts time information from each of the received three advertised packets, and restarts the tablet terminal 40 and reconnects to a wireless LAN in a case where each piece of time information is equal to disconnection time (9:45) stored in the disconnection time DB 45. A reconnection process is not limited to rebooting but can also include executing a command and the like designated in advance.

Specific Example

Figure 5:
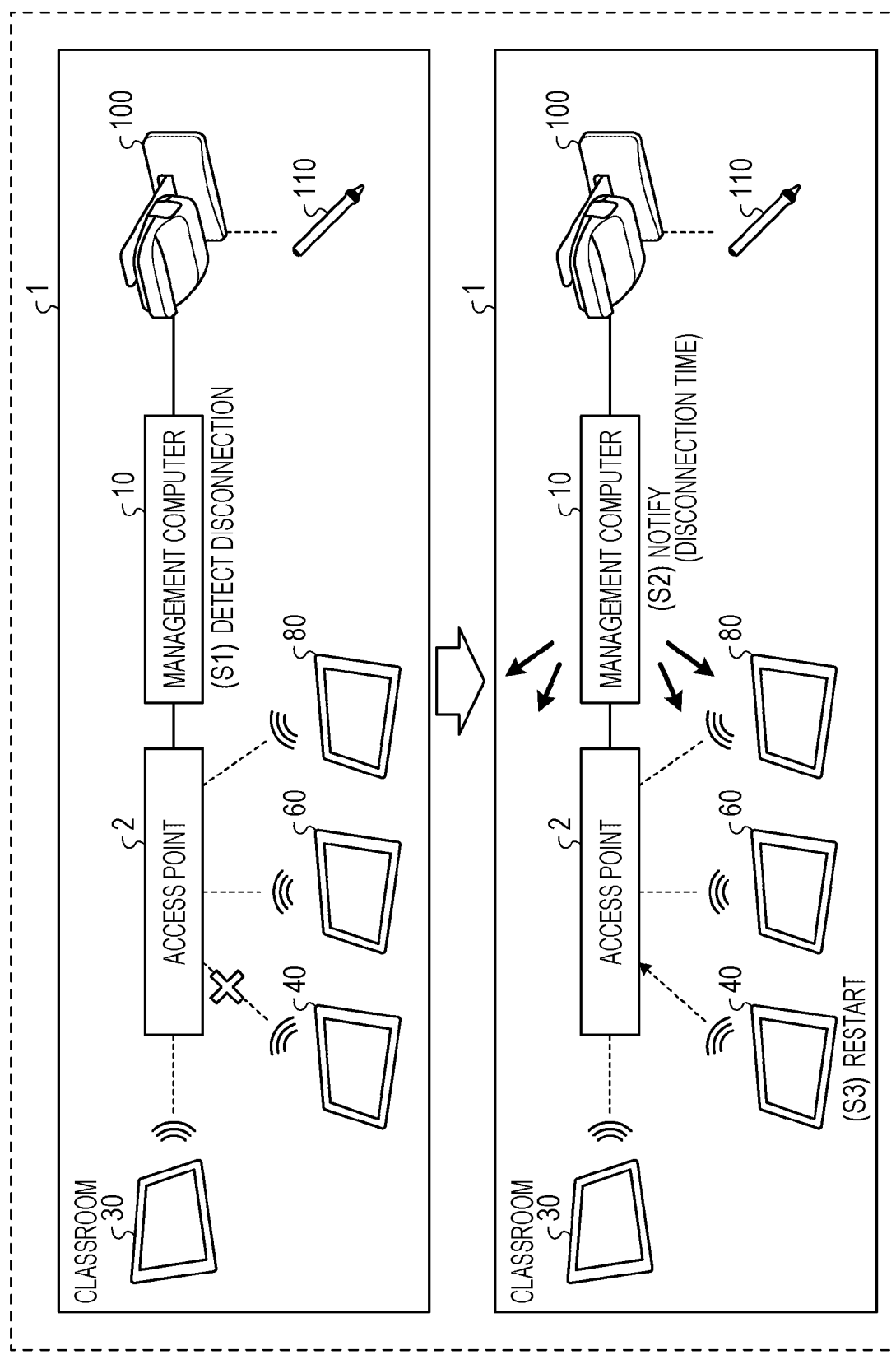
FIG. 5 is a diagram illustrating an example of automatic recovery, according to an embodiment.

Next, a specific example of reconnection to a wireless LAN described in Example 1 will be described. FIG. 5 is a diagram for explaining automatic recovery according to Example 1. As illustrated in FIG. 5, in the classroom 1, a class is held by the tablet terminal 30 for teacher, the tablet terminals 40, 60, and 80 for students, and the management computer 10 being coupled to each other by a wireless LAN via the access point 2. In this state, it is assumed that the tablet terminal 40 is disconnected from the access point 2.

The management computer 10 obtains connection status from the access point 2 and detects unexpected disconnection of the tablet terminal 40 (S1). At this time, the management computer 10 obtains disconnection time from the connection status.

Next, the management computer 10 specifies a beacon pattern assigned to the tablet terminal 40 from the beacon pattern DB 13 and broadcasts an advertised packet including the disconnection time by using the specified beacon pattern (S2).

Thereafter, each of the tablet terminals 40, 60, and 80 receives the advertised packets. When the tablet terminal 40 among the tablet terminals 40, 60, and 80 receives the advertised packets with a beacon pattern assigned to the tablet terminal 40, the tablet terminal 40 determines that the advertised packets are addressed to the tablet terminal 40. When disconnection time included in each of the advertised packets matches with disconnection time stored in the disconnection time DB 45 of the tablet terminal 40, the tablet terminal 40 executes restarting (S3).

In this way, the management computer 10 executes automatic connection of a tablet terminal disconnected from a wireless LAN via a wireless network different from a wireless LAN.

Flow of Process

Next, a process of each of devices will be described. Here, a process of the management computer 10 and a process of a disconnected tablet terminal will be described. As an example, a disconnected tablet terminal is the tablet terminal 40.

Process of Management Computer 10

Figure 6:
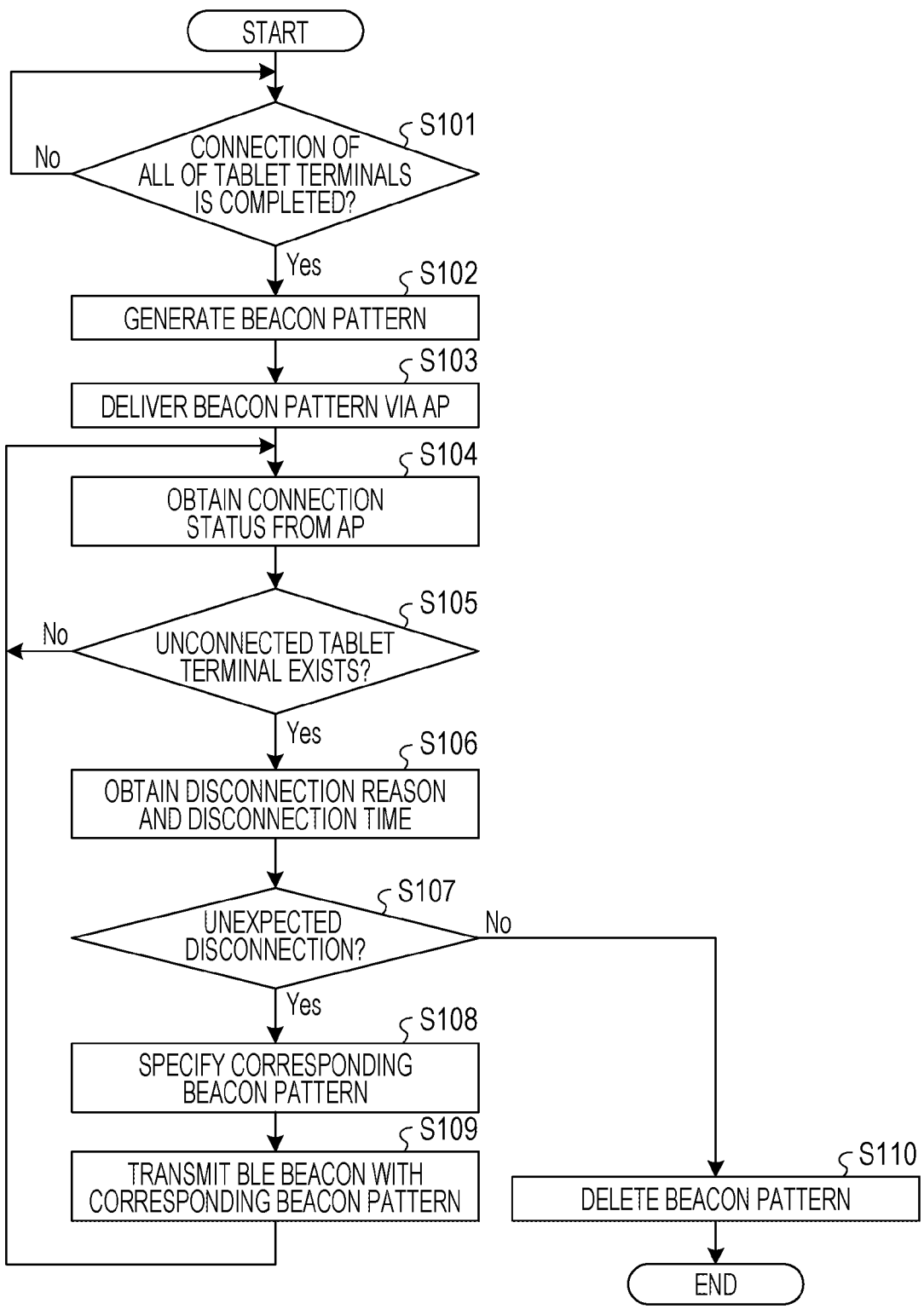
FIG. 6 is a diagram illustrating an example of an operational flowchart for a process of a management computer, according to an embodiment.

FIG. 6 is a flowchart illustrating a flow of a process of the management computer 10 according to Example 1. As illustrated in FIG. 6, when connection of all of tablet terminals is completed (Yes in S101), the pattern generating unit 16 of the management computer 10 generates a beacon pattern (S102). Thereafter, the delivering unit 17 delivers the beacon pattern to each of the tablet terminals via the access point 2 (S103). In the case, the pattern generating unit 16 may receive a notification of connection completion from the access point 2 or may also determine the connection completion from connection status obtained from the access point 2.

Next, upon obtaining the connection status from the access point 2 (S104), the monitoring unit 18 determines whether or not an unconnected tablet terminal exists (S105). Here, the monitoring unit 18 stores a disconnection reason and the like in the connection status DB 14. In a case where an unconnected tablet terminal does not exist (No in S105), the monitoring unit 18 repeats S104 and the following steps.

In a case where the monitoring unit 18 determines that an unconnected tablet terminal exists (Yes in S105), the instruction notification unit 19 obtains a disconnection reason and disconnection time (S106). The disconnection reason may be determined also by the management computer 10 and the access point 2 by using the similar method.

Thereafter, in a case where the disconnection reason is "unexpected disconnection" (Yes in S107), the instruction notification unit 19 specifies a beacon pattern corresponding to a tablet terminal of "unexpected disconnection" from the beacon pattern DB 13 (S108). Next, the instruction notification unit 19 transmits an advertised packet including the disconnection time with the corresponding beacon pattern as a BLE beacon (S109). Thereafter, S104 and the following steps are repeated.

On the other hand, in a case where the disconnection reason is not "unexpected disconnection" (No in S107), the instruction notification unit 19 determines that a class is ended and deletes a beacon pattern stored in the beacon pattern DB 13 (S110).

Process of Tablet Terminal 40

Figure 7:
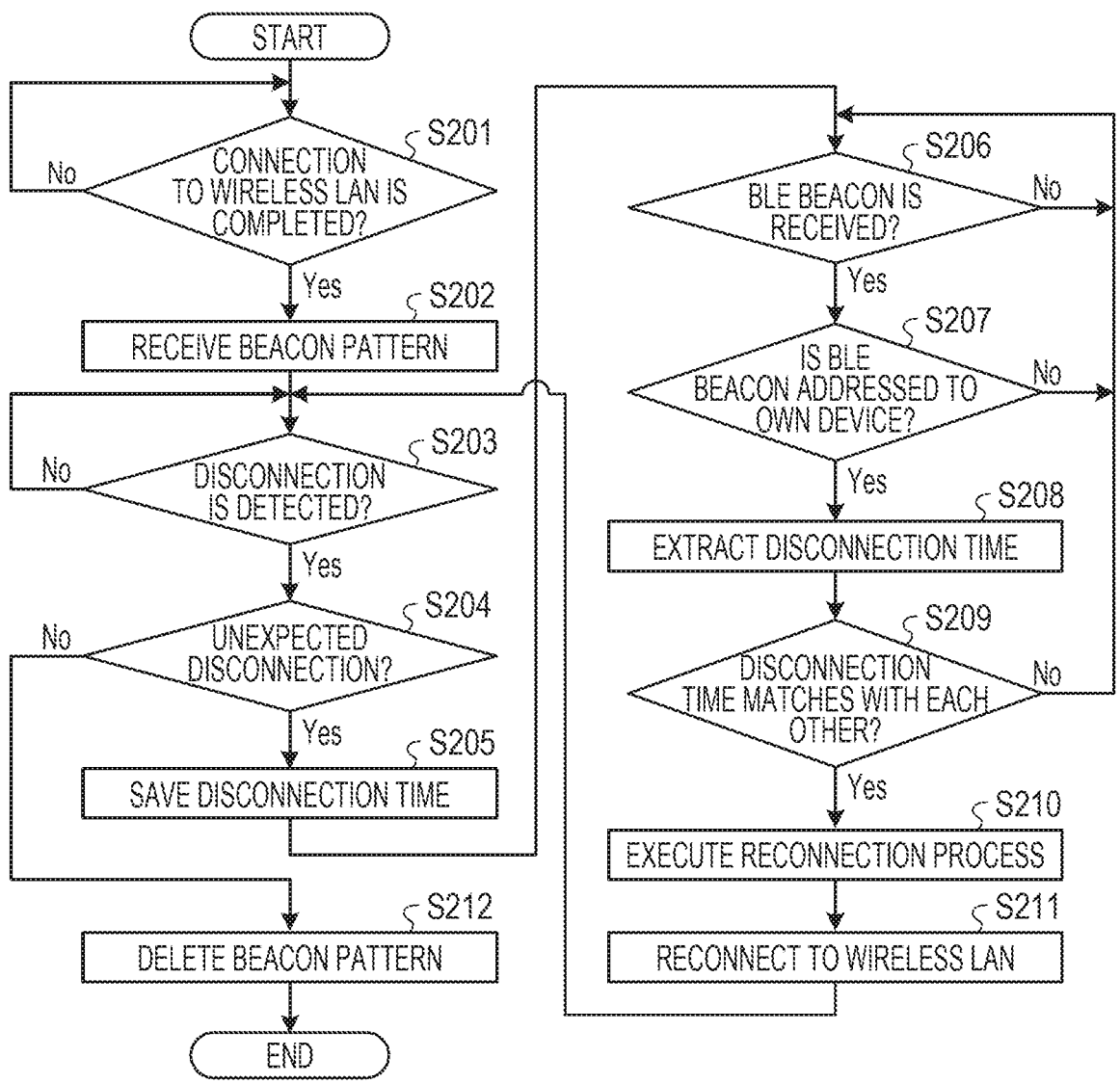
FIG. 7 is a diagram illustrating an example of an operational flowchart for a process of a tablet terminal, according to an embodiment.

FIG. 7 is a flowchart illustrating a flow of a process of the tablet terminal 40 according to Example 1. As illustrated in FIG. 7, after connection to a wireless LAN is completed (Yes in S201), the receiver 48 of the tablet terminal 40 receives a beacon pattern by a wireless LAN via the access point 2 and saves the beacon pattern in the beacon pattern DB 44 (S202).

Thereafter, upon detecting a tablet disconnected from a wireless LAN (Yes in S203), the controller 46 determines whether or not a disconnection reason is unexpected disconnection (S204). Here, in a case where it is determined that the disconnection reason is unexpected disconnection (Yes in S204), the controller 46 saves the disconnection time in the disconnection time DB 45 (S205).

Thereafter, in a case where a BLE beacon is received (Yes in S206) and it is determined that the BLE beacon is addressed to the tablet terminal 40, based on the beacon pattern (Yes in S207), the reconnection unit 49 extracts disconnection time from each of advertised packets transmitted as a BLE beacon (S208).

In a case where the extracted disconnection time matches with disconnection time stored in the disconnection time DB 45 (Yes in S209), the reconnection unit 49 executes a reconnecting process (S210) and reconnects to a wireless LAN (S211). Thereafter, S203 and the following steps are repeated.

On the other hand, in a case where the extracted disconnection time does not match with disconnection time stored in the disconnection time DB 45 (No in S209), the flow returns to S206 and the reconnection unit 49 waits for receiving a BLE beacon. In a case where it is determined that the disconnection reason is not unexpected disconnection in S204 (No in S204), the controller 46 deletes a beacon pattern from the beacon pattern DB 44 (S212).

Effect

As described above, even in a case where a low-performance tablet terminal is used, the management computer 10 may be automatically recovered from a trouble of a wireless LAN connection without going through a person. As a result, it is possible to provide an environment which minimizes class stop time.

In addition, in a case where a wireless LAN disconnection occurs and a BLE beacon which each of tablet terminals for students receives is addressed to the tablet terminal for student, pieces of information about disconnection time are compared and wireless LAN recovery operation is performed when the pieces of information about disconnection time match with each other. Therefore, since the tablet terminal for student receives the BLE beacon only when disconnected from a wireless LAN and performs wireless LAN recovery operation only when pieces of information about disconnection time match with each other, it is possible to realize more securely remote recovery. In addition, since only disconnection time is transmitted and leakage of address information of a tablet terminal may be suppressed even if the disconnection time leaks to an outside, the management computer 10 may minimize damage caused by a malicious third party.

Example 2

In Example 1, an example in which a reconnection instruction is notified to a tablet terminal in a state of the tablet terminal being disconnected by using a beacon pattern and broadcasting is described, but the example is not limited thereto. For example, it is also possible to directly connect to a tablet terminal during disconnection and to execute a reconnecting process by using a Bluetooth® (hereinafter, may be referred to as "BT"). Therefore, in Example 2, an example in which the management computer 10 is directly connected to a tablet terminal during disconnection and causes the tablet terminal to execute a reconnecting process and to automatically recover the connection to a wireless LAN will be described.

Description of Automatic Recovery of Example 2

Figure 8:
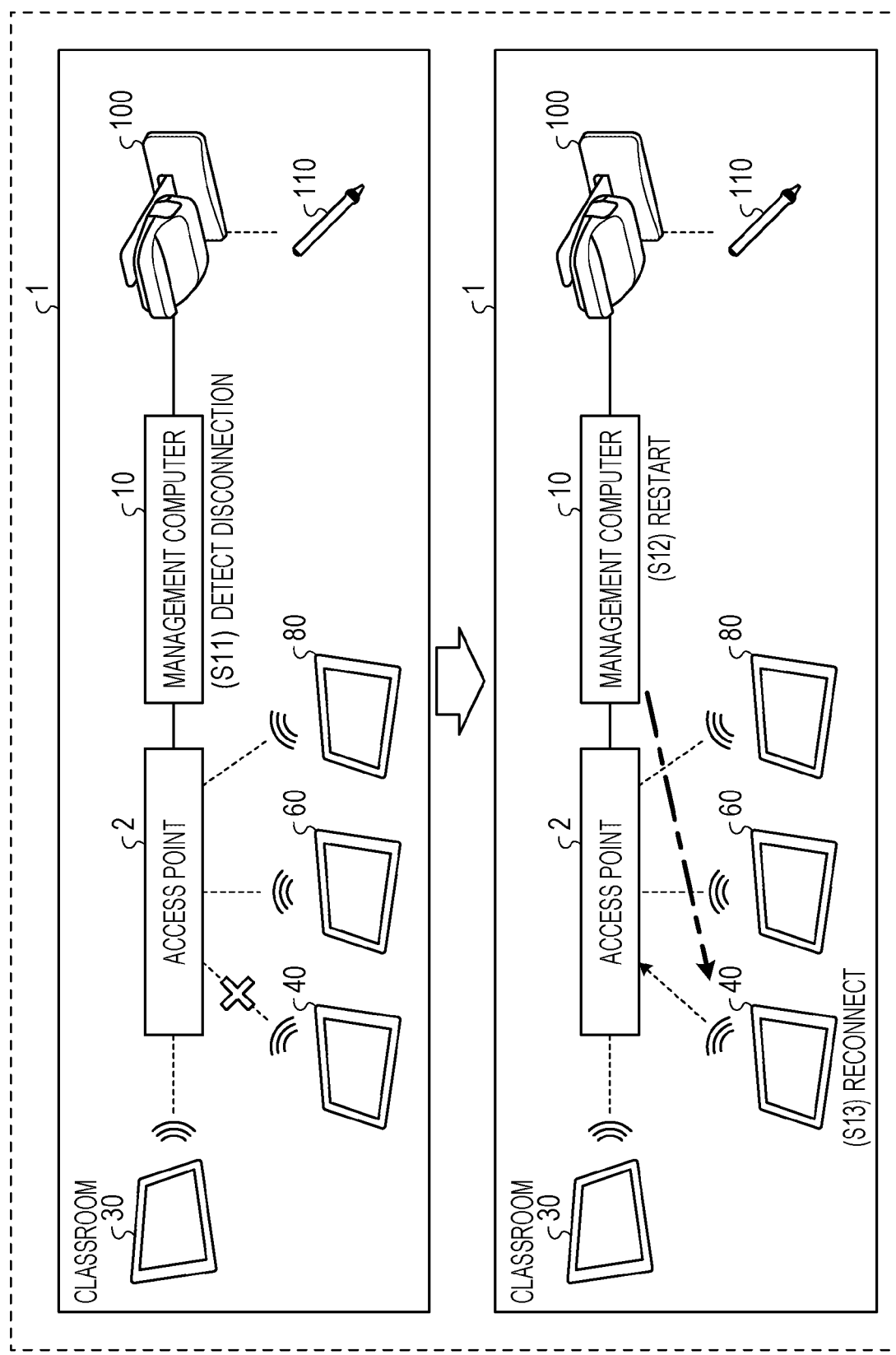
FIG. 8 is a diagram illustrating an example of automatic recovery, according to an embodiment.

FIG. 8 is a diagram for explaining automatic recovery according to Example 2. An overall configuration of a system illustrated in FIG. 8 is the same as that of Example 1.

As illustrated in FIG. 8, in a state in which a class is held using a wireless LAN in the classroom 1, the management computer 10 obtains connection status from the access point 2 and detects unexpected disconnection of the tablet terminal 40 (S11). At this time, the management computer 10 obtains disconnection time from the connection status.

Next, the management computer 10 directly connects to the tablet terminal 40 during the disconnection from a wireless LAN by using BT, and issues a restarting command to the tablet terminal 40 (S12). As a result, the tablet terminal 40 is able to automatically reconnect to a wireless LAN (S13).

Functional Configuration

Next, functional configurations of devices illustrated FIG. 8 will be described. Here, among functional configurations of the management computer 10 and the tablet terminal 40, functions different from those of Example 1 will be described. The same reference numerals are given to the same functions, but different processes will be separately described even if the same reference numerals are given.

Functional Configuration of Management Computer 10

Figure 9:
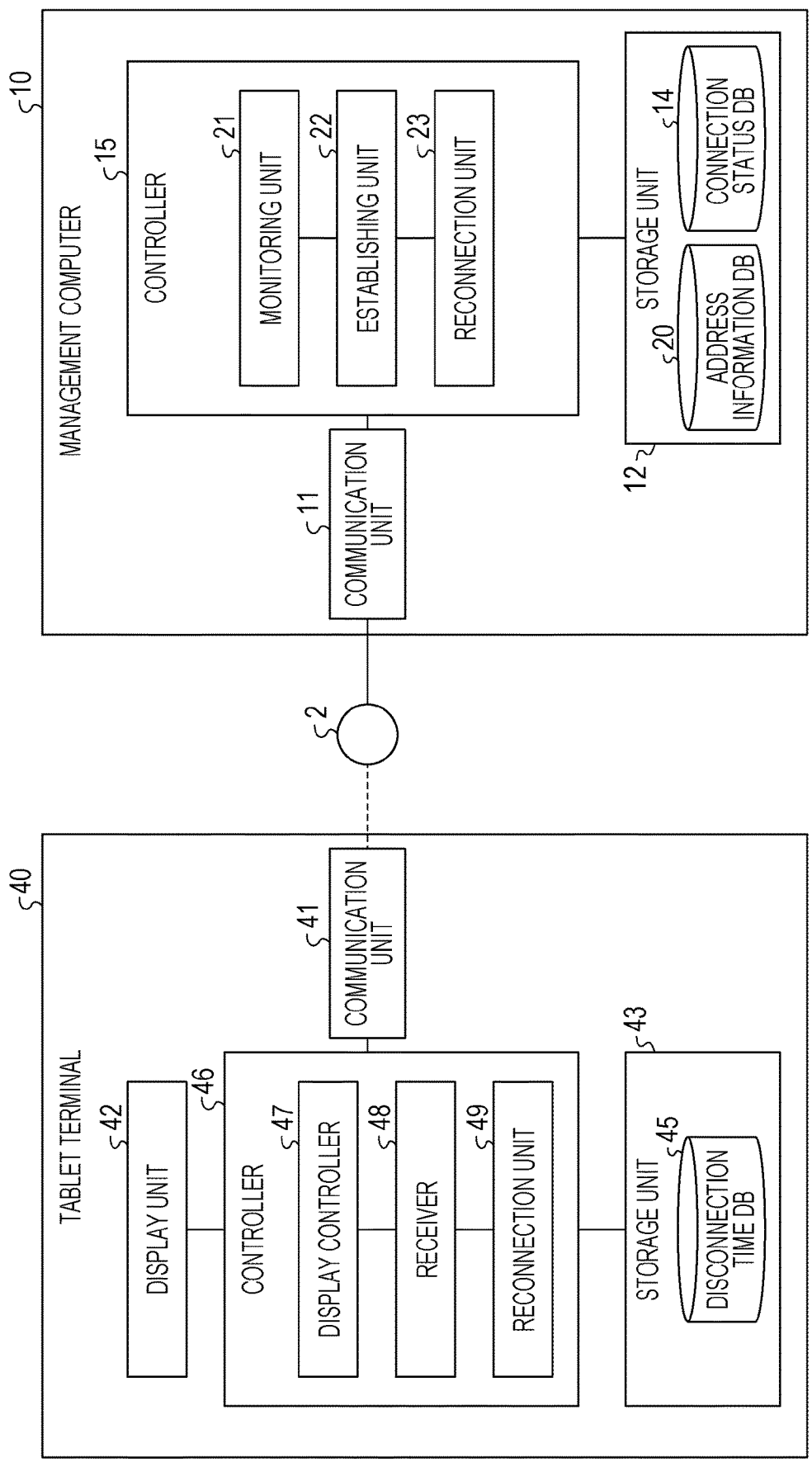
FIG. 9 is a diagram illustrating an example of a functional configuration of each of devices, according to an embodiment.

FIG. 9 is a functional block diagram illustrating a functional configuration of each of devices according to Example 2. As illustrated in FIG. 9, the management computer 10 includes the communication unit 11, the storage unit 12, and the controller 15.

The storage unit 12 is a storage device which stores a program executed by the controller 15 or various kinds of data and is, for example, a memory or a hard disk. The storage unit 12 stores the connection status DB 14 and an address information DB 20.

The address information DB 20 is address information used for BT connection and stores a Bluetooth® Device address (BD address) of each of the tablet terminals. Information stored therein is set and changed by an administrator or the like.

FIG. 10 is a diagram illustrating an example of information stored in the address information DB 20. As illustrated in FIG. 10, the address information DB 20 stores "tablet terminal", "MAC address", and "BD address" in association with each other. "tablet terminal" is a name of a tablet terminal used by a student, and "MAC address" is a MAC address of the tablet terminal for each student. "BD address" is address information used for BT connection.

In the example in FIG. 10, a MAC address of a tablet terminal of the student C is "A1:B2:C3:F3:E2:D3" and a BD address thereof is "B1:C2:D3:G3:F2:E3".

The controller 15 is a processing unit which manages the whole of the management computer 10 and is, for example, a processor or the like. The controller 15 includes a monitoring unit 21, an establishing unit 22, and a reconnection unit 23. The monitoring unit 21, the establishing unit 22, and the reconnection unit 23 are an example of an electronic circuit included in a processor or the like or an example of a process executed by the processor.

The monitoring unit 21 executes the same process as the monitoring unit 18 described Example 1. For example, the monitoring unit 21 obtains connection status (status and disconnection time) from the access point 2 and monitors whether or not unexpected disconnection occurs. For example, the monitoring unit 21 regularly obtains connection status from the access point 2 and saves the obtained connection status in the connection status DB 14. Then, in a case of detecting status "unconnected" during a class, the monitoring unit 21 sets "unexpected disconnection" to "disconnection reason" of a tablet terminal corresponding to "unconnected".

The establishing unit 22 is a processing unit which establishes BT connection with a tablet terminal being disconnected from wireless LAN. For example, upon detecting, with reference to the connection status DB 14, a tablet terminal for which "unexpected disconnection" is registered, the establishing unit 22 specifies a BD address of the corresponding tablet terminal from the address information DB 20. The establishing unit 22 executes BT connection by designating the specified BD address and establishes BT connection with the tablet terminal being disconnected from wireless LAN.

For example, upon detecting "unexpected disconnection" of a tablet terminal of the student C with reference to the connection status DB 14, the establishing unit 22 obtains a BD address "B1:C2:D3:G3:F2:E3" of the tablet terminal of the student C from the address information DB 20. The establishing unit 22 designates the BD address "B1:C2:D3:G3:F2:E3" to transmit a BT connection request. Thereafter, upon receiving a connection response, the establishing unit 22 establishes BT connection with a tablet terminal of the student C to which the BD address "B1:C2:D3:G3:F2:E3" is set.

The reconnection unit 23 is a processing unit which causes the tablet terminal disconnected from a wireless LAN to execute a reconnecting process. For example, the reconnection unit 23 issues start operation or a command of the reconnecting process by BT communication to the tablet terminal in which BT connection is established by the establishing unit 22. In the above example, the reconnection unit 23 issues a command or the like of restarting by BT connection to the tablet terminal of the student C in which BT connection is established.

When the tablet terminal of the student C is restarted, the reconnection unit 23 automatically establishes BT connection with the tablet terminal of the student C. Then, the reconnection unit 23 determines that reconnection to a wireless LAN is completed and automatically disconnects BT connection.

Functional Configuration of Tablet Terminal 40

As illustrated in FIG. 9, the tablet terminal 40 includes the communication unit 41, the display unit 42, the storage unit 43, and the controller 46.

A difference from FIG. 2 described in Example 1 is that the storage unit 43 does not store the beacon pattern DB 44. In addition, since the reconnection unit 49 of the controller 46 includes a process different from Example 1, the process will be described.

The reconnection unit 49 is a processing unit which establishes BT connection with the management computer 10 and receives an instruction for a reconnecting process via the BT connection, in contrast with Example 1. For example, in a case where "unexpected disconnection" is detected by the controller 46, the reconnection unit 49 moves to a waiting state for BT connection. Thereafter, upon receiving a connection request by BT from the management computer 10, the reconnection unit 49 transmits a connection response to the management computer 10 by using BT.

In this way, in a state in which the reconnection unit 49 may not be connected to a wireless LAN, the reconnection unit 49 establishes BT connection with the management computer 10. Thereafter, the reconnection unit 49 receives a restarting command or the like from the management computer 10 via BT connection. The tablet terminal 40 executes restarting by receiving a restarting command from the management computer 10. Restarting may be performed remotely by the management computer 10 or performed locally by the management computer 10.

Thereafter, when the tablet terminal 40 is restarted, the reconnection unit 49 automatically establishes BT connection with the management computer 10. Thereafter, when the reconnection unit 49 determines that reconnection to a wireless LAN is completed, the reconnection unit 49 automatically disconnects BT connection.

Flow of Process

Next, a process of each of devices according to Example 2 will be described. Here, a process of the management computer 10 and a process of a tablet terminal will be described. As an example, a disconnected tablet terminal is the tablet terminal 40.

Process of Management Computer 10

Figure 11:
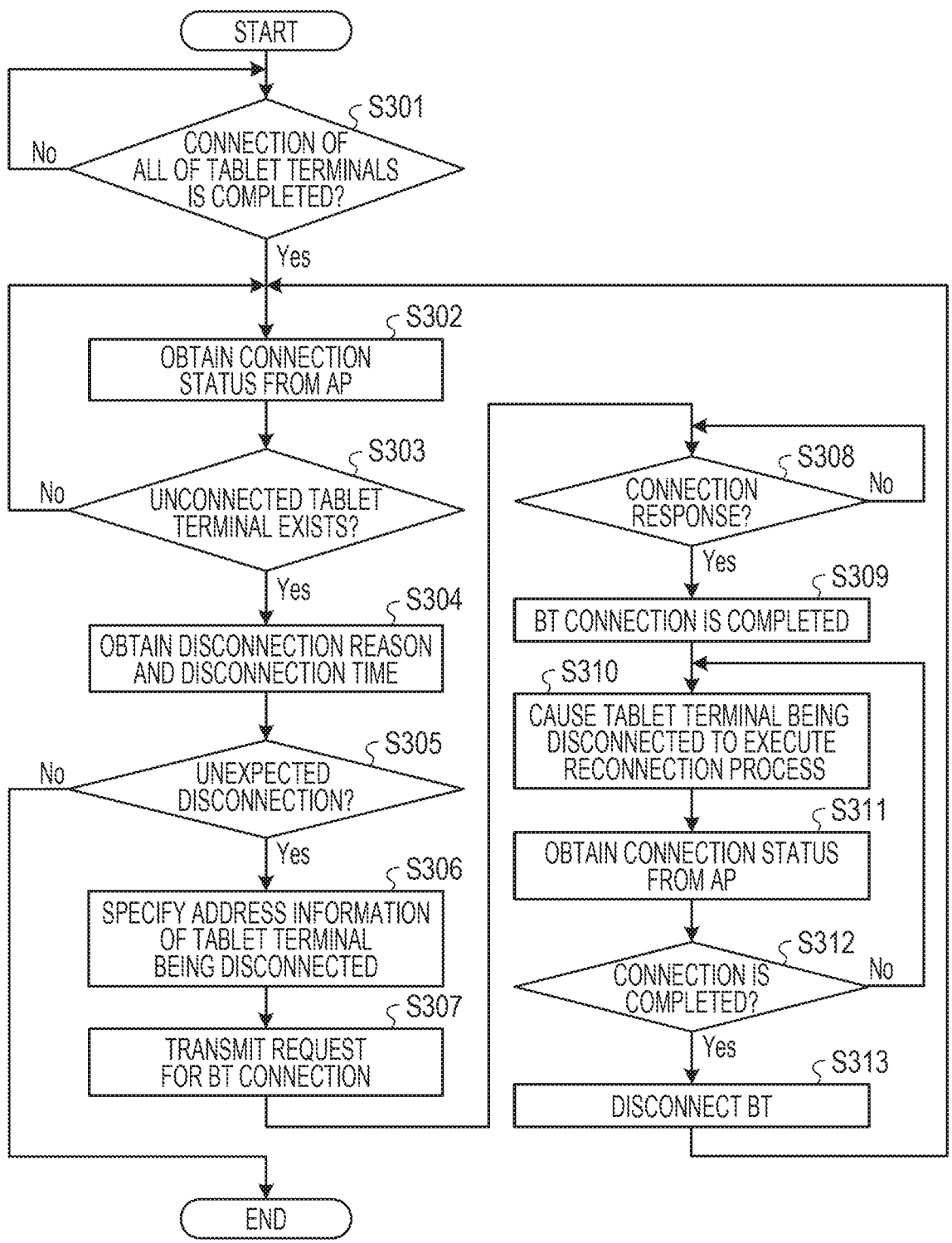
FIG. 11 is a diagram illustrating an example of an operational flowchart for a process of a management computer, according to an embodiment.

FIG. 11 is a flowchart illustrating a flow of a process of the management computer 10 according to Example 2. As illustrated in FIG. 11, when connection of all of the tablet terminals is completed (Yes in S301) and connection status is obtained from the access point 2 (S302), the monitoring unit 21 of the management computer 10 determines whether or not an unconnected tablet terminal exists (S303). Here, in a case where an unconnected tablet terminal does not exist (No in S303), the monitoring unit 21 repeats S302 and the following steps.

In a case where the monitoring unit 21 determines that an unconnected tablet terminal exists (Yes in S303), the establishing unit 22 obtains a disconnection reason and disconnection time (S304).

Thereafter, in a case where the disconnection reason is "unexpected disconnection" (Yes in S305), the establishing unit 22 specifies address information (BD address) of a tablet terminal being disconnected corresponding to "unexpected disconnection", from the address information DB 20 (S306).

Next, the establishing unit 22 transmits a request for BT connection by designating the specified address information (S307). Upon receiving a connection response (Yes in S308), the establishing unit 22 completes BT connection with the tablet terminal being disconnected (S309).

The reconnection unit 23 causes, by using BT, the tablet terminal being disconnected to execute a reconnecting process (S310). In a case where connection completion of the unconnected tablet is confirmed according to the connection status afterward obtained by the monitoring unit 21 (Yes in S312), the reconnection unit 23 disconnects BT (S313). Thereafter, S302 and the following steps are repeated.

On the other hand, in a case where the unconnected tablet terminal is detected in the connection status afterward obtained by the monitoring unit 21 and connection completion of the unconnected tablet is not confirmed (No in S312), the reconnection unit 23 returns to S310 and executes the reconnecting process to the tablet terminal being disconnected again. The reconnection unit 23 may execute S313 without executing S311 and S312 assuming that reconnection to a wireless LAN is completed. Even in this case, since an unconnected state is detected by obtaining the next connection status, the reconnecting process may be repeatedly executed.

On the other hand, in a case where it is determined that the disconnection reason is not "unexpected disconnection" (No in S305), the process is ended.

Process of Tablet Terminal 40

Figure 12:
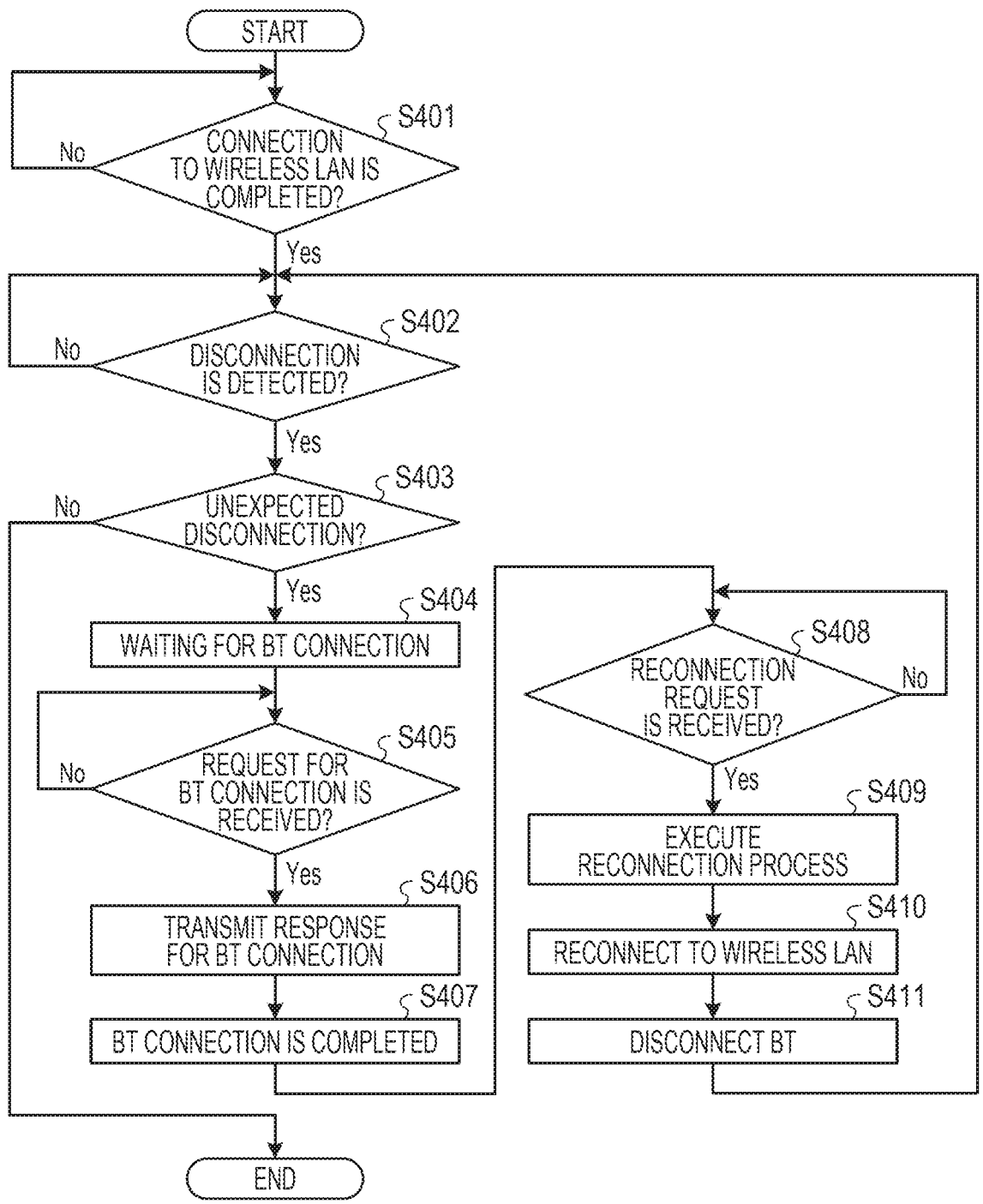
FIG. 12 is a diagram illustrating an example of an operational flowchart for a process of a tablet terminal, according to an embodiment.

FIG. 12 is a flowchart illustrating a flow of a process of the tablet terminal 40 according to Example 2. As illustrated in FIG. 12, after connection to a wireless LAN is completed (Yes in S401), upon detecting disconnection from a wireless LAN (Yes in S402), the controller 46 of the tablet terminal 40 determines whether or not a disconnection reason is unexpected disconnection (S403). Here, in a case where the disconnection reason is not unexpected disconnection (No in S403), the controller 46 ends the process.

On the other hand, in a case where the controller 46 determines that the disconnection reason is unexpected disconnection (Yes in S403), the reconnection unit 49 moves to a waiting state for BT connection (S404). Upon receiving a request for BT connection from the management computer 10 (Yes in S405), the reconnection unit 49 transmits a response for BT connection to the management computer 10 (S406). Then, the reconnection unit 49 completes BT connection (S407).

Thereafter, upon receiving a reconnection request via BT (Yes in S408), the reconnection unit 49 execute the reconnecting process (S409), reconnects to a wireless LAN (S410), and disconnects BT (S411). The reconnection unit 49 may control BT to disconnect BT after reconnection to a wireless LAN succeeds, or may control BT to disconnect BT regardless of success or failure of reconnection after restarting is completed.

Effect

In this way, the management computer 10 transmits a reconnection operation instruction to a tablet terminal of a student, and the tablet terminal of the student executes reconnection operation. When the tablet terminal of the student is reconnected to a wireless LAN, the tablet terminal disconnects BT connection. Therefore, since the tablet terminal of the student establishes BT connection only during a time period in which reconnection operation to a wireless LAN is being performed, it is possible to minimize power consumption. In addition, since the management computer 10 is directly connected to a tablet terminal being disconnected and causes the tablet terminal to execute reconnection, it is possible to improve a probability of success in reconnection.

Example 3

Although the examples of the embodiment are described so far, the embodiment may be implemented in various different forms in addition to the examples described above. Therefore, different examples will be described below.

Wireless Line

Although a wireless LAN or BLE, a wireless LAN and BT, and the like are described as examples in the above examples, the embodiment is not limited thereto. For example, instead of BT or BLE, other non-contact communication or the like may be adopted.

In addition, since advertising channel frequencies (37 ch, 38 ch, and 39 ch) used for the above BLE beacon are not overlapped with channel frequencies (1 ch, 6 ch, and 11 ch) used for an ordinary wireless LAN, it is possible to reduce failure due to radio wave interference. In addition, a beacon is not limited to BLE, another beacon may be adopted, and channels may also be used for other channels not used for a wireless LAN and the like.

Tablet Terminal

Although a tablet terminal for student is described as a target of automatic recovery in the above examples, the embodiment is not limited thereto and a tablet terminal for teacher may be a target of automatic recovery. In addition, not only a tablet terminal but also another computer such as a smartphone, a server, or the like may be a target of automatic recovery.

Transmission Information

Although an example in which disconnection time is transmitted by a BLE beacon is described in Example 1, it is possible to execute only a notification using a beacon pattern without transmitting disconnection time. By transmitting the disconnection time, it is possible to execute a two-step determination of a notification using the beacon pattern and a coincidence of the disconnection time, thereby improving a security level.

Environment

Although a wireless LAN in a classroom is described as an example in the above examples, the embodiment is not limited thereto and may apply to inside a hospital, inside a warehouse, inside a vehicle, or the like in the same manner.

Hardware Configuration of Management Computer 10

Figure 13:
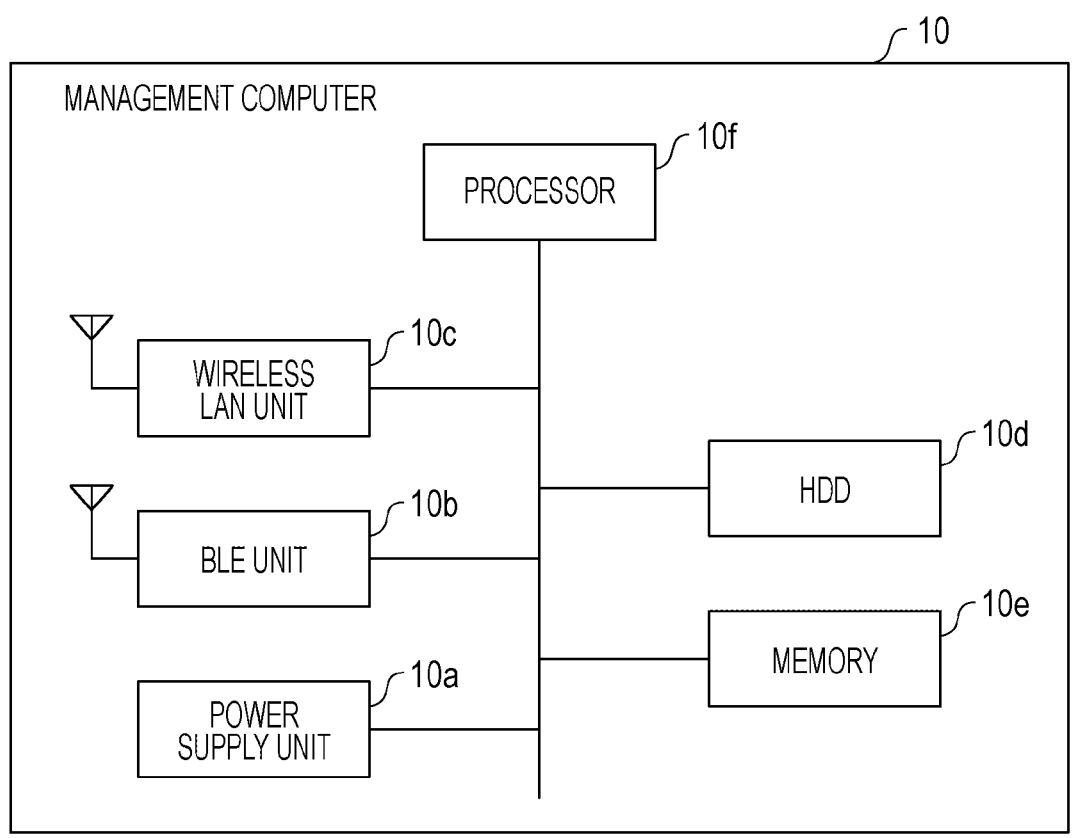
FIG. 13 is a diagram illustrating an example of a hardware configuration of a management computer, according to an embodiment.

FIG. 13 is a diagram illustrating an example of a hardware configuration of the management computer 10. As illustrated in FIG. 13, the management computer 10 includes a power supply unit 10a, a BLE unit 10b, a wireless LAN unit 10c, a hard disk drive (HDD) 10d, a memory 10e, and a processor 10f.

The power supply unit 10a controls a power supply of the management computer 10. The BLE unit 10b executes transmission control of a BLE beacon. The wireless LAN unit 10c is coupled to a wireless LAN via the access point 2 and executes transmission and reception of data. The HDD 10d is an example of a storage device which stores a program, data, and the like.

An example of the memory 10e is a random access memory (RAM) such as a synchronous dynamic random access memory (SDRAM), a read only memory (ROM), a flash memory, or the like. An example of the processor 10f is a central processing unit (CPU), a digital signal processor (DSP), a field programmable gate array (FPGA), a programmable logic device (PLD), or the like.

In addition, the management computer 10 operates as an information processing device which executes a reconnection method by reading and executing a program. That is, the management computer 10 executes a program which executes the same function as the pattern generating unit 16, the delivering unit 17, the monitoring unit 18, and the instruction notification unit 19. As a result, the management computer 10 is able to execute a process which executes the same function as the pattern generating unit 16, the delivering unit 17, the monitoring unit 18, and the instruction notification unit 19. A program according to the embodiment is not limited to being executed by the management computer 10. For example, even in a case where another computer or another server executes a program or a case where the computer and the server execute a program in cooperation with each other, the embodiment may be applied in the same manner. The same applies to a program which executes the same function as each of functional units described in Example 2.

This program may be distributed via a network such as the Internet. In addition, the program is recorded in a computer readable recording medium such as a hard disk, a flexible disk (FD), a CD-ROM, a magneto-optical disk (MO), a digital versatile disc (DVD) and can be executed by a computer reading from the recording medium.

Hardware Configuration of Tablet Terminal 40

Figure 14:
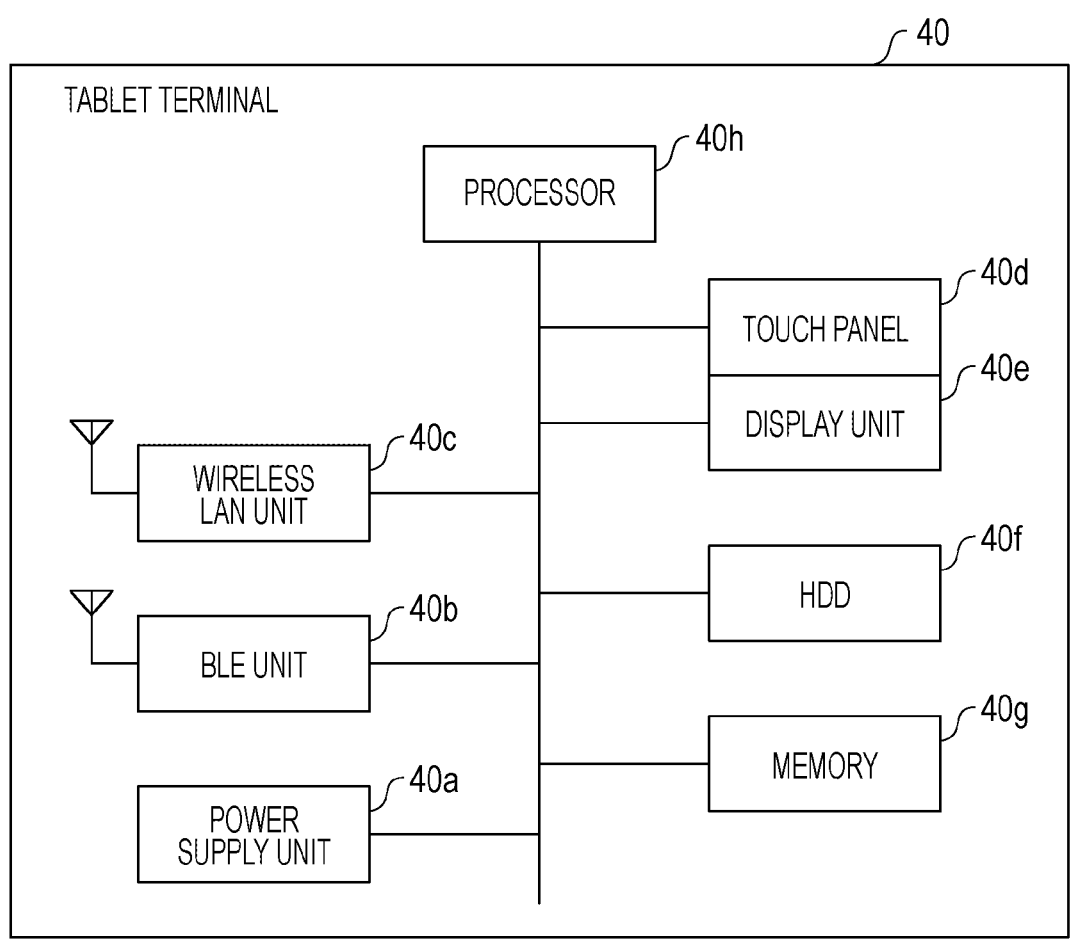
FIG. 14 is a diagram illustrating an example of a hardware configuration of a tablet terminal, according to an embodiment.

FIG. 14 is a diagram illustrating an example of a hardware configuration of the tablet terminal 40. As illustrated in FIG. 14, the tablet terminal 40 includes a power supply unit 40a, a BLE unit 40b, a wireless LAN unit 40c, a touch panel 40d, a display unit 40e, an HDD 40f, a memory 40g, and a processor 40h.

The power supply unit 40a controls a power supply of the tablet terminal 40. The BLE unit 40b executes reception control of a BLE beacon. The wireless LAN unit 40c is coupled to a wireless LAN via the access point 2 and executes transmission and reception of data.

The touch panel 40d is an input unit which is overlapped with the display unit 40e and accepts user operation, and outputs an operated position (coordinate) on the processor 40h. The touch panel 40d may adopt various methods such as a capacitive method and an electromagnetic induction method. The display unit 40e is an example of a display unit which displays various kinds of information.

The HDD 40f is an example of a storage device which stores a program, data, and the like. An example of the memory 40g is a RAM such as an SDRAM and the like, a ROM, a flash memory, or the like. An example of the processor 40h is a CPU, a DSP, an FPGA, a PLD, or the like.

In addition, the tablet terminal 40 operates as an information processing device which executes a reconnection method by reading and executing a program. That is, the tablet terminal 40 executes a program which executes the same function as the display controller 47, the receiver 48, and the reconnection unit 49. As a result, the tablet terminal 40 is able to execute a process which executes the same function as the display controller 47, the receiver 48, and the reconnection unit 49. A program according to the embodiment is not limited to being executed by the tablet terminal 40. For example, even in a case where another computer or another server executes a program or a case where the computer and the server execute a program in cooperation with each other, the embodiment may be applied in the same manner.

This program may be distributed via a network such as the Internet. In addition, the program is recorded in a computer readable recording medium such as a hard disk, a flexible disk (FD), a CD-ROM, an MO, and a DVD and can be executed by a computer reading from the recording medium.

System

In addition, among all processes described in the present examples, all or a part of the processes explained as being automatically performed can also be performed manually. Alternatively, all or a part of the processes described as being performed manually can be automatically performed by a known method. Further, processing procedures, control procedures, specific names, and information including various data and parameters illustrated in the document or in the drawings can be arbitrarily changed unless otherwise noted.

In addition, each of components of each of devices illustrated in the drawing is functionally conceptual and is not desirable to be physically configured as illustrated in the drawing. In other words, specific forms of distribution and integration of each of the devices are not limited to those illustrated in the drawings. That is, all or a part thereof may be configured by being functionally or physically distributed and integrated as arbitrary units according to various loads and use situations. Further, all or an arbitrary part of each of processing functions performed in each of the devices may be realized by a CPU and a program analyzed and executed by the CPU, or may be realized as hardware by wired logic.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus comprising:
a memory; and
a processor that is coupled to the memory and that:
obtains, from an access point, connection status information of each of terminal devices coupled to a first wireless network via the access point,
detects, from among the terminal devices based on the connection status information, a disconnected device whose communication with the access point is disconnected, and
transmits, via a second wireless network and to the disconnected device without going through the access point, a reconnection instruction that instructs the disconnected device to reconnect to the first wireless network by accessing the access point.

2. The apparatus of claim 1, wherein
the processor further:
delivers, to each of the terminal devices, a beacon pattern assigned to each of the terminal devices, wherein the beacon pattern is a combination of transmission frequency channels of a beacon used for the second wireless network; and
transmits the reconnection instruction to the disconnected device by broadcasting a beacon that includes the reconnection instruction using a beacon pattern assigned to the disconnected device.

3. The apparatus of claim 2, wherein
the processor further:
extracts a disconnection time at which the communication between the disconnected device and the access point is disconnected, and
instructs the disconnected device that holds the disconnection time to execute reconnection to the first wireless network by broadcasting the beacon using the beacon pattern assigned to the disconnected device, wherein the beacon includes the disconnection time.

4. The apparatus of claim 1, wherein
the processor further:
stores address information used in the second wireless network by the terminal devices; and
establishes connection with the disconnected device via the second wireless network using address information, among the address information used in the second wireless network, assigned to the disconnected device, and
the reconnection instruction transmitted via the second wireless network includes a command to restart the disconnected device.

5. A method comprising:
obtaining, from an access point, connection status information of each of terminal devices coupled to a first wireless network via the access point;
detecting, from among the terminal devices based on the connection status information, a disconnected device whose communication with the access point is disconnected;
transmitting, via a second wireless network and to the disconnected device without going through the access point, a reconnection instruction that causes instructs the disconnected device to reconnect to the first wireless network by accessing the access point; and
executing, at the disconnected device, a reconnection process to the first wireless network based on the reconnection instruction received over the second wireless network.

6. The method of claim 5, further comprising:
delivering, to each of the terminal devices, a beacon pattern assigned to each of the terminal devices, wherein the beacon pattern is a combination of transmission frequency channels of a beacon used for the second wireless network, and
wherein the transmitting of the reconnection instruction includes broadcasting a beacon that includes the reconnection instruction based on a beacon pattern assigned to the disconnected device.

7. The method of claim 6, further comprising
extracting a disconnection time at which the communication between the disconnected device and the access point is disconnected, and
instructing the disconnected device that holds the disconnection time to execute reconnection to the first wireless network by broadcasting the beacon using the beacon pattern assigned to the disconnected device, wherein the beacon includes the disconnection time.

8. The method of claim 5, further comprising:
storing address information used in the second wireless network by the terminal devices, and
wherein the transmitting of the reconnection instruction includes establishing connection with the disconnected device via the second wireless network using address information, among the address information used in the second wireless network, assigned to the disconnected device, and
wherein the reconnection instruction transmitted via the second wireless network includes a command to restart the disconnected device.

9. A non-transitory computer-readable recording medium that stores a program for causing a computer to execute:
obtaining, from an access point, connection status information of each of terminal devices coupled to a first wireless network via the access point;
detecting, from among the terminal devices based on the connection status information, a disconnected device whose communication with the access point is disconnected; and
transmitting, via a second wireless network and to the disconnected device without going through the access point, a reconnection instruction that instructs the disconnected device to reconnect to the first wireless network by accessing the access point.

* * * * *